United States Patent [19]
Ishizuka et al.

[11] Patent Number: 5,675,430
[45] Date of Patent: Oct. 7, 1997

[54] ROTARY POLYGON MIRROR

[75] Inventors: Yutaka Ishizuka; Shinji Ohta, both of Nagano, Japan

[73] Assignee: Kabushiki Kaisha Sankyo Seiki Seisakusho, Nagano, Japan

[21] Appl. No.: 543,934

[22] Filed: Oct. 17, 1995

[30] Foreign Application Priority Data

Oct. 17, 1994 [JP] Japan .................................. 6-250722

[51] Int. Cl.$^6$ ............................ G02B 26/08; G02B 7/182
[52] U.S. Cl. ........................ 359/216; 359/850; 359/855; 359/871; 359/900
[58] Field of Search ............................ 359/216–219, 359/850, 855, 871, 900

[56] References Cited

U.S. PATENT DOCUMENTS 4,826,271  5/1989  Takahashi et al. ..................... 359/218

Primary Examiner—James Phan
Attorney, Agent, or Firm—Sughrue, Mion, Zinn, Macpeak & Seas

[57] ABSTRACT

A blank is formed of a sintered alloy by sintering a mixture of powdered materials including powdered aluminum, and at least one of powdered silicon, powdered magnesium, and powdered chromium. This blank, being made of the sintered body, can be molded into a shape close to the final shape of a rotary polygon mirror. For example, a mirror surface can be molded into a desired shape in advance. Therefore, the final product of the rotary polygon mirror can be obtained with ease by subjecting the blank to a simple finishing process by cutting.

9 Claims, 3 Drawing Sheets

ROTARY POLYGON MIRROR

BACKGROUND OF THE INVENTION

1. Field of the Invention

The invention relates to the material and structure of a rotary polygon mirror (so-called "polygon mirror") used for light deflectors.

2. Related Art

FIG. 4 is a sectional view showing a conventional example of a light deflector that has a rotary polygon mirror mounted thereon. In FIG. 4, reference numeral 2 denotes a frame attached to the chassis of the main body of, e.g., a laser beam printer. A fixed shaft 3 is arranged in the center of the frame 2. Ball bearings 4a, 4b are attached to the fixed shaft 3 while interposing an appropriate distance therebetween. Further, a stator core 8 is secured to the frame 2, the stator core 8 having a plurality of radially projecting salient poles. A coil 11 is wound around each salient pole. The frame 2, the stator core 8, and the coils 11 constitute the fixed part of the light deflector.

On the other hand, the outer rings of the ball bearings 4a, 4b are fitted with and fixed to the inner hole of a hub 5. Therefore, the hub 5 is rotatably supported by the fixed shaft 3 through the ball bearings 4a, 4b. The hub 5 has a stepped portion 5a and a flange portion 5b. The stepped portion 5a carries a rotary polygon mirror 1 thereon. The flange portion 5b is arranged so as to extend further toward the outer circumference than the stepped portion 5a. A cylindrical drive magnet 7 is attached to the inner circumferential surface of the flange portion 5b through a yoke 6 that is made of a magnetic material. The drive magnet 7 confronts the salient poles of the stator core 8 through a predetermined distance. The hub 5, the yoke 6, and the drive magnet 7 constitute the rotary part of the light deflector.

The rotary polygon mirror 1 has in the center thereof a through hole engageable with the hub 5 that is the rotary member. The through hole is engaged with the hub 5 and is fixed to the hub 5 through a clamper 9 and tightening members 10 with a part of the bottom surface of the rotary polygon mirror abutted against the stepped portion 5a of the hub 5.

When the coils 11 wound around the stator core 8 are energized, the rotary member is rotated by electromagnetic action of the drive magnet 7 and the stator core 8, causing the rotary polygon mirror 1 to rotate simultaneously therewith.

If the thus constructed light deflector does not rotate stably and smoothly over a long period of time, it is likely to cause shortcomings such that the laser beam cannot be injected into and reflected at a correct position on the mirror surface. More specifically, when irregular rotation occurs or when the reflecting surface is distorted, jitters aggravate to hamper injection and reflection of the laser beam at the correct position, thus adversely affecting the quality of an image. To overcome this problem, not only the rotary member but also the rotary polygon mirror of the light deflector must be manufactured accurately as well as economically.

For this reason, the conventional rotary polygon mirror has generally been formed by cutting a solid material such as a rolled plate, a bar, or an extrusion-molded rod made of a highly anticorrosive A6061- or A5056-class aluminum alloy.

Usually, the solid material is first machined into a shape that is close to a final product shape to obtain a blank material (primary machining process), and then the thus obtained blank material is subjected to a finishing process to obtain a finished rotary polygon mirror (secondary machining process).

For example, the solid material is machined into a disklike body using a milling machine, a lathe, or the like in the primary machining process, and not only a through hole is formed in the center of the disklike body, but also the outer circumferential surface of the disklike body is cut into a regular polygon, with the corners of the regular polygon chamfered if necessary, to form the blank material. Further, in the secondary machining process, the inner circumferential surface of the through hole engageable with the hub, a mounting reference surface, and a reflecting surface are cut, and the reflecting surface is thereafter subjected to a finishing process with a diamond tool.

It may be noted that the outer shape of the rotary polygon mirror is formed substantially into, as known well, a regular polygon as viewed from top with the rotary axis running vertically, and has a through hole in the center thereof. A reflecting mirror for reflecting a laser beam is formed on a side surface.

As described above, the conventional rotary polygon mirror, since it is prepared by forming the blank material while subjecting the solid material to the primary machining process and then by subjecting the blank material to the secondary machining process (finishing process), has the following problem:

(1) Since the rotary polygon mirror is formed of a solid material, large quantities of scraps are produced during the primary machining process to form the blank material, thus wasting the material.

(2) A large number of machining process steps are involved in the primary and secondary machining processes, which makes productivity very low.

(3) The solid material exhibits poor machinability, and this entails much expertise such as the shape of the cutting edge of a cutting tool, cutting amount and feed speed during cutting, and the like for forming the reflecting surface. As a result, yield is low and it is difficult to supply the product inexpensively in large quantities.

(4) Since the solid material is cut with the cutting tool being abutted against the solid material while the solid material is being turned, scraps, each being an elongated curled strip, are produced, and these scraps are twined around the cutting edge of the cutting tool, thus impairing the cutting performance. Further, the so-called "built-up edge" occurs with chips deposited on the cutting edge of the cutting tool, thus impairing cutting accuracy as well. Still further, the machining operation must be monitored to check if the cutting tool is broken, which makes it difficult to automate the machining process.

(5) It is common practice to supply cutting oil to a part to be machined during the machining operation both in order to decrease cutting resistance of the cutting tool against the solid material, which is a body to be cut, and in order to control heating during the cutting operation. The cutting oil present over the rotary polygon mirror must be cleaned using a detergent, and this not only makes the manufacturing process long but also requires cleaning equipment.

SUMMARY OF THE INVENTION

The invention has been made to overcome the aforementioned problems encountered by the conventional art. The object of the invention is, therefore, to provide a rotary polygon mirror that can be prepared with reduced material cost and simplified machining process by curtailing wastes, and that can improve productivity by improving machinability during the machining process while forming the rotary polygon mirror of a sintered material.

According to an aspect of the present invention, there is provided a rotary polygon mirror being fixed to a rotary member and rotating integrally with the rotary member, the rotary polygon mirror made of a sintered material formed by sintering a mixture of powdered materials obtained by adding to powdered aluminum at least one kind of powdered materials selected from a group consisting of powdered silicon, powdered copper, and powdered magnesium as an additive or additives, and a density of the sintered material is 95%.

As described in the foregoing, the rotary polygon mirror of the invention is characterized as forming a sintered body by adding to powdered aluminum, which is a main component, any one kind of powdered material selected from the group consisting of powdered silicon, powdered copper, and powdered magnesium as an additive and setting the density of the thus formed sintered body to 95% or more. Therefore, not only the material cost can be reduced by dispensing with wastes in the materials, but also the machining process can be simplified. In addition, the sintered body provides stable machining accuracy and improves yield with satisfactory machinability, thereby allowing the rotary polygon mirror to be supplied in large quantities inexpensively.

While the adding of any one of silicon, copper, and magnesium to the sintered body as the requisite additive improves strength and hardness, the adding of chromium improves corrosion resistance as well as hardness. The adding of iron improves strength, malleability, and ductility. The adding of titanium contributes not only to reducing weight but also to improving corrosion resistance and hardness. The adding of manganese is effective in deoxidizing, and the adding of zinc as a component of the sintering material further improves the bonding property among a plurality of metals.

Still further, the forming of the rotary polygon mirror by subjecting a blank material made of a sintered body to a finishing process means that the blank material that is close to the final shape of the rotary polygon mirror can be obtained in advance by sintering, and this contributes to simplifying the machining process and improving productivity.

Still further, screw holes can also be formed during the blank material forming process, and this contributes to skipping the conventional through hole forming process. In addition, each screw hole has a large-diameter portion and a small-diameter portion arranged concentrically, and the large-diameter portion is made deeper than the small-diameter portion. Therefore, the reflecting surface of the rotary polygon mirror is hard to distort even if the rotary polygon mirror is deformed by tightening the screws. Hence, images obtained by scanning through the mirror surface of the rotary polygon mirror remain high quality. As a result, a highly economical, highly reliable rotary polygon mirror can be supplied.

BRIEF DESCRIPTION OF THE DRAWINGS

FIG. 3 (b) is a sectional view taken along a line x-o-x'; and

DETAILED DESCRIPTION OF THE PREFERRED EMBODIMENTS

A rotary polygon mirror, which is an embodiment of the invention, will now be described with reference to FIGS. 1 to 3. Since the light deflector in the conventional example is not distinguished in substance from a light deflector for driving the rotary polygon mirror of the invention, it is the material and structure of the rotary polygon mirror of the invention that will be highlighted in this section.

The rotary polygon mirror of the invention is made of a sintered material formed by sintering a mixture of powdered materials in which powdered silicon, powdered copper, powdered magnesium, powdered chromium, powdered iron, powdered manganese, powdered zinc, and powdered titanium are mixed with powdered aluminum. For example, a sintered metallic body having substantially the same properties as 6061-class aluminum alloy is prepared by sintering a mixture having an equivalent mixture composition ratio to a 6061-class aluminum alloy as specified in the Japanese Industrial Standard (JIS). The 6061-class aluminum is an aluminum alloy prepared by adding to aluminum, which is the main component, 0.4 to 0.8 wt % of silicon, 0.15 to 0.4 wt % of copper, 0.8 to 1.2 wt % of magnesium, 0.04 to 0.35 wt % of chromium, about 0.7 wt % of iron, about 0.15 wt % of manganese, about 0.25 wt % of zinc, and about 0.15 wt % of titanium. In contrast thereto, the sintered material used in the invention is prepared by mixing all these materials in powdered form and sintering the mixture of the powdered materials.

It is not necessary to add all the aforementioned powdered metals to the powdered aluminum. Any one of silicon, copper, and magnesium (all in the form of a powder) can be used as the additive. The adding of any one of silicon, copper, and magnesium contributes to improving strength and hardness. The adding of chromium in addition to the requisite additive(s) contributes to corrosion resistance as well as hardness. The adding of iron also contributes to improving strength, malleability, and ductility. The adding of titanium contributes to not only reducing weight but also improving corrosion resistance and hardness. Further, manganese may be added as a deoxidizer. Still further, the adding of zinc as a component of the sintered material leads to increasing the bonding property among a plurality of metals.

Therefore, the rotary polygon mirror can be made of a material that is obtained by adding to powdered aluminum at least one kind of additive selected from the group consisting of powdered silicon, powdered copper, and powdered magnesium. In addition, one kind or more of powdered metals selected from the group consisting of powdered chromium, powered iron, powdered manganese, powdered zinc, and powdered titanium can also be added.

Figure 1:
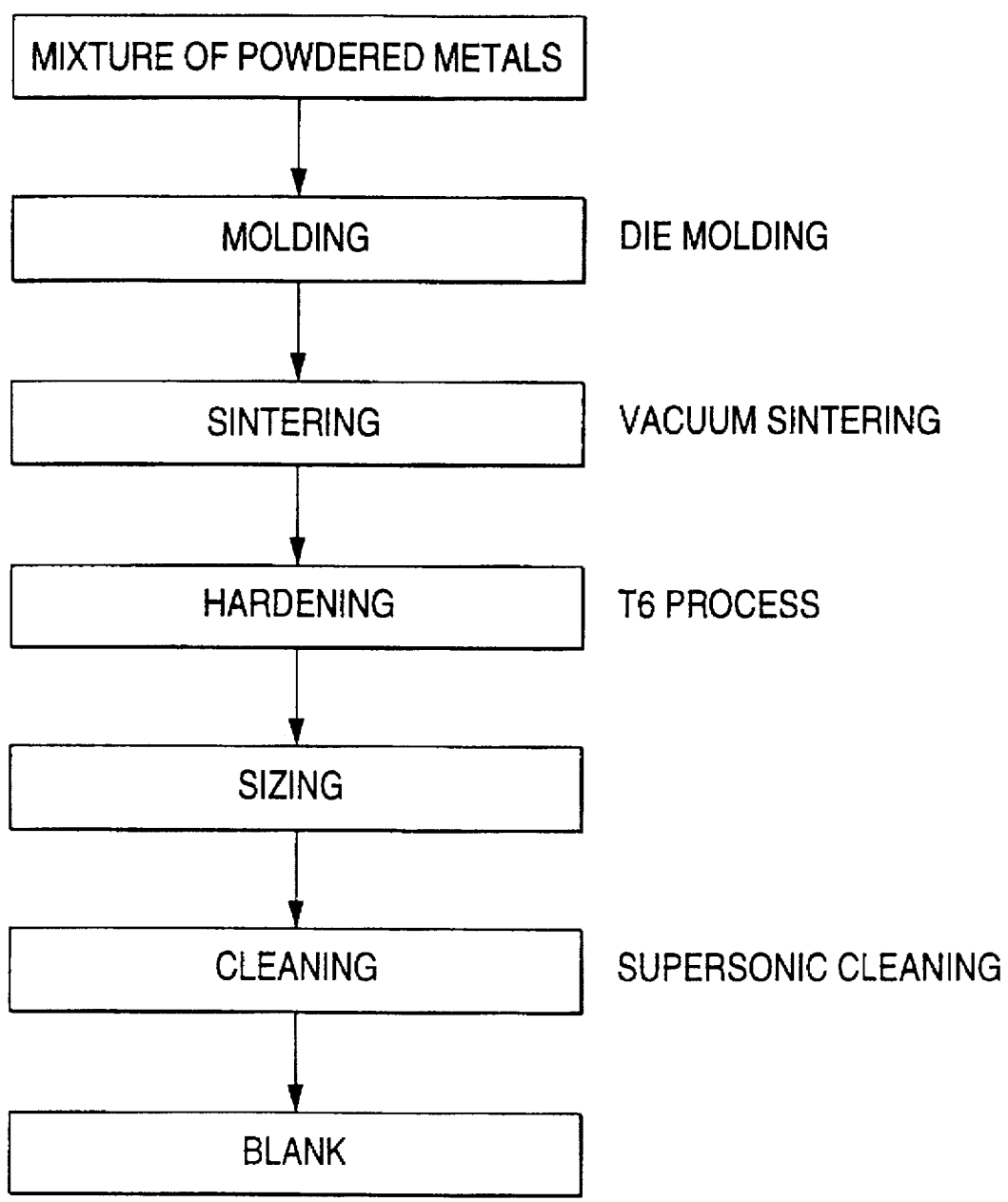
FIG. 1 is a diagram showing an exemplary process for manufacturing a rotary polygon mirror of the invention.

An exemplary process for manufacturing the rotary polygon mirror by sintering a mixture of powdered materials is shown in FIG. 1. First of all, a mixture of powdered materials, essentially consisting of aluminum for sintering, e.g., which has the aforementioned mixture composition ratio, equivalent to 6061-class aluminum according to JIS, is prepared by mixing with powdered aluminum silicon, copper, magnesium, and the like in the form of powders. Then, such mixture of powdered materials is charged into a mold and molded by pressure so as to form the same shape as a blank material (to be described later), and thereafter sintered in a vacuum to obtain a sintered body. The thus prepared sintered body is subjected to a so-called "T6 process" for hardening. As a result, the hardness of the sintered body can be improved. Then, the inner circumferential surface of a through hole formed in the center of the sintered body is plastically worked during a sizing process. As a result of this process, the roundness of the through hole can be improved. Successively, the thus far processed sintered body is subjected to a cleaning process using a supersonic cleaning system or the like to prepare the blank material that is almost coincident with the final shape of the rotary polygon mirror.

Figure 2:
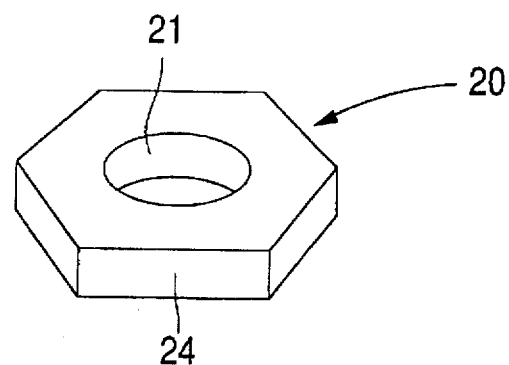
FIG. 2 is a perspective view showing an exemplary blank material out of which the rotary polygon mirror of the invention is made.

An example of the thus prepared blank material of the rotary polygon mirror is shown in FIG. 2. Since the blank material 20 of the rotary polygon mirror is made of a sintered material, the blank material 20 is molded into a shape close to the final shape of the rotary polygon mirror as shown in FIG. 2. That is, the outer circumference is formed, into a regular polygon (a regular hexagon in the case shown in FIG. 2), and a desired roundness is obtained for the inner circumferential surface of the through hole 21 in the center by the sizing process. Therefore, after the blank material 20 is subjected to a finishing process so as to form the outer circumferential surface 24 into a mirror surface, the final shape of the rotary polygon mirror can be obtained with ease. Hence, the process of the invention is significantly simplified compared with the conventional process involving the steps of cutting the final shape out of a solid material. A saving of chips and scraps is another advantage that contributes to a reduction in material cost.

Figure 3:
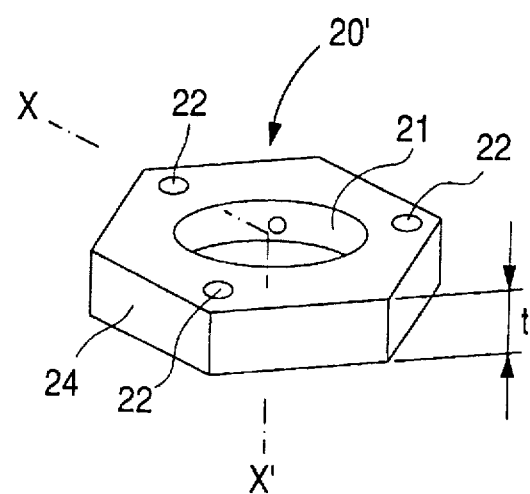
FIG. 3 (a) is a perspective view of another embodiment of the present invention.
Figure 3:
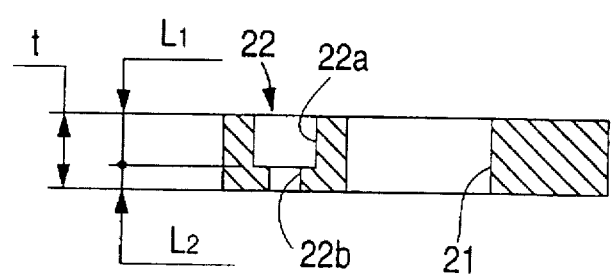
Figure 4:
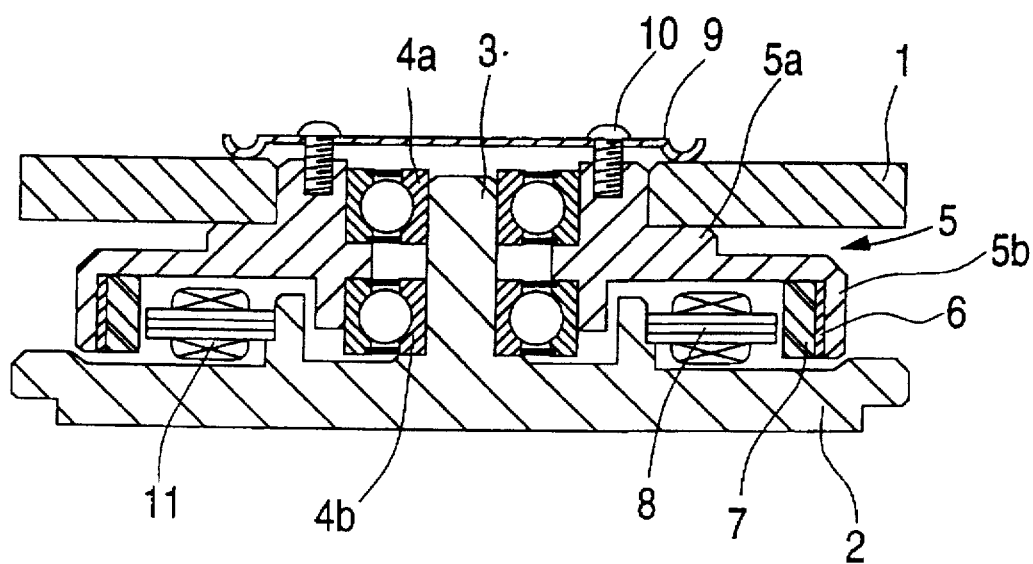
FIG. 4 is a sectional view of an exemplary conventional light deflector.

Another embodiment of the invention is shown in FIG. 3. FIG. 3 shows a differently shaped blank material 20' of a rotary polygon mirror formed by sintering. In the case of this embodiment, through holes 22 for firmly screwing the blank material 20' to the hub are formed at the stage of molding as shown in FIG. 3 (a). FIG. 3 (b) is a sectional view taken along a line x-o-x' of FIG. 3 (a). Each screwing through hole 22 is formed so that a large-diameter portion 22a and a small-diameter portion 22b are vertically arranged concentrically with a step interposed therebetween. The depth L1 of the large-diameter portion 22a is related to the depth L2 of the small-diameter portion 22b by an equality, L1>L2. It may be noted that t=L1+L2 where t is the total thickness of the blank material 20' of the rotary polygon mirror.

A screw (not shown) is inserted into each through hole 22 so that the rotary polygon mirror 22' is fixed to the hub serving as the rotary member. The head of each screw is brought into contact with the step formed by the large-diameter portion 22a and the small-diameter portion 22b and tightened onto the step. However, since L1>L2, the reflecting surface 24 is hard to distort even if the rotary polygon mirror is slightly deformed by the tightening of the screw. As a result, high quality images can be formed through the scanning operation performed by the rotary polygon mirror of the invention.

The blank materials 20, 20' shown in FIGS. 2 and 3 are obtained by molding a mixture of powdered materials essentially consisting of aluminum and sintering the molded body as has already been described. Therefore, these blank materials have a shape quite close to the final shape of the rotary polygon mirror. However, strict dimensional accuracy requirements are not yet met on these blank materials. Therefore, a portion requiring strict dimensional accuracy, e.g., the reflecting surface 24, must be subjected to a finishing process by cutting. Since the inner circumferential surface of the central through hole 21 and the screwing through holes 22 have been formed at the time of preparing the blank materials, such surface and holes need not be subjected to the cutting process.

Since the aluminum-containing sintered body of the invention exhibits satisfactory machinability and since chips and scraps produced out of the cutting operation are in powdered form or in short lengths, there is no possibility that such chips and scraps will be twined around the cutting edge of a cutting tool, and this fact ensures so excellent a cutting accuracy that there is no possibility the cutting tool will be broken when the reflecting surface 24 and the like are subjected to a finishing process. Therefore, it is no longer necessary to watch the cutting machine and the like at all times, which means that the cutting operation can be automated. In addition, since the sintered body exhibits excellent machinability, the sintered body has less cutting resistance and produces less heat than the solid material. Therefore, the sintered body of the invention can be cut using no cutting oil. As a result, after the finishing process has been completed, chips deposited on the rotary polygon mirror can be cleaned simply with city water or purified water, which in turn contributes not only to simplifying the process compared with the conventional process using the cutting oil, but also to reducing cleaning equipment cost.

By the way, a rotary polygon mirror used for light deflectors must have a reflectance that is more than a predetermined value by processing the reflecting surface onto which a laser beam is injected with a high degree of accuracy in order to keep the quality of an image high. For this reason, a rotary polygon mirror made of a sintered body must have a very high average density over the entire part thereof in order to obtain the necessary reflectance.

The rotary polygon mirror of the invention which is made of a sintered body essentially consisting of aluminum can have an average density of 95% or more by sintering powdered aluminum with the aforementioned additives; i.e., the necessary reflectance can be obtained. Therefore, a reflectance equivalent to that of the conventional rotary polygon mirror formed by cutting a solid material can be obtained.

If only powdered aluminum is sintered, or if powdered aluminum is sintered with additives other than the aforementioned additives, a sintered body with a desired density cannot be obtained, and what is worse, the reflectance of the reflecting surface is decreased, making the rotary polygon mirror unusable.

The invention can provide an average density of 95% over the entire part of the sintered body. In addition, a reflectance that is more than a predetermined value can be given to the reflecting mirror by implementing the above average density. Moreover, by implementing an average density of 95%, the rigidity of the rotary polygon mirror itself is increased, thereby improving weight balance and rotational balance.

While the invention made by the inventors has been specifically described with reference to the embodiments, the invention is not limited to the aforementioned embodiments but may, of course, be modified in various respects without departing from the scope and spirit thereof. For example, while the rotary polygon mirror is shaped as a regular hexagon in the aforementioned embodiments, the rotary polygon mirror may be shaped as any regular polygon such as a regular pentagon or a regular octagon. Further, modified regular polygons, e.g., a modified regular polygon whose corners are chamfered, may also be applicable. Still further, while ball bearings are used to support the rotary member of the light deflector in the aforementioned embodiments, other bearings, such as dynamic pressure bearings and slide bearings may be used.

As described above, the rotary polygon mirror of the invention is a sintered body formed by adding to powdered aluminum, which is a main component, any one kind of powdered material selected from the group consisting of powdered silicon, powdered copper, and powdered magnesium as an additive, and setting the density of the thus formed sintered body to 95% or more. Therefore, not only the material cost can be reduced by dispensing with wastes in the materials, but also the machining process can be simplified. In addition, the sintered body provides stable machining accuracy and improves yield with satisfactory machinability, thereby allowing the rotary polygon mirror to be supplied in large quantities inexpensively.

While the adding of any one of silicon, copper, and magnesium to the sintered body as the requisite additive improves strength and hardness, the adding of chromium improves corrosion resistance as well as hardness. The adding of iron improves strength, malleability, and ductility. The adding of titanium contributes not only to reducing weight but also to improving corrosion resistance and hardness. The adding of manganese is effective in deoxidizing, and the adding of zinc as a component of the sintering material further improves the bonding property among a plurality of metals.

Still further, the forming of the rotary polygon mirror by subjecting a blank material made of a sintered body to a finishing process means that the blank material that is close to the final shape of the rotary polygon mirror can be obtained in advance by sintering, and this contributes to simplifying the machining process and improving productivity.

Still further, the screw holes can also be formed during the blank material forming process, and this contributes to skipping the conventional through hole forming process. In addition, each screw hole has a large-diameter portion and a small-diameter portion arranged concentrically, and the large-diameter portion is made deeper than the small-diameter portion. Therefore, the reflecting surface of the rotary polygon mirror is hard to distort even if the rotary polygon mirror is deformed by tightening the screws. Hence, images obtained by scanning through the mirror surface of the rotary polygon mirror remain high quality. As a result, a highly economical, highly reliable rotary polygon mirror can be supplied.

What is claimed is:

1. A rotary polygon mirror that is fixed to a rotary member and rotated integrally with the rotary member, wherein said rotary polygon mirror is made of a sintered material formed by sintering a mixture of powdered materials comprising powdered aluminum and at least one kind of powdered material selected from a group consisting of powdered silicon, powdered copper, and powdered magnesium, and wherein a density of the sintered material is not less than 95%.

2. A rotary polygon mirror according to claim 1, wherein said mixture of powdered materials further comprises at least one kind of powdered material selected from a group consisting of powdered chromium, powdered iron, powdered manganese, powdered zinc, and powdered titanium.

3. A rotary polygon mirror according to any one of claims 1 and 2, wherein the rotary polygon mirror is formed by subjecting a blank material to a cut finishing process to obtain a reflecting surface, and the blank material is made of the sintered material and has a shape substantially the same as a final shape of the rotary polygon mirror.

4. A rotary polygon mirror according to any one of claims 1 and 2, wherein the rotary polygon mirror has a through hole for engaging the rotary member, and the inner circumferential surface of the through hole is plastically worked to size the through hole.

5. A rotary polygon mirror according to claim 3, wherein the blank material is formed with a screw hole in which a screw is inserted for securing the rotary polygon mirror to the rotary member.

6. A rotary polygon mirror according to claim 5, wherein the screw hole has a large-diameter portion and a small-diameter portion, the large-diameter portion and the small-diameter portion are concentric, and a depth of the large-diameter portion in the direction of thickness of the rotary polygon mirror is greater than a depth of the small-diameter portion in the same direction.

7. A method for manufacturing a rotary polygon mirror that is fixed to a rotary member and rotates integrally with the rotary member, comprising steps of:

preparing a mixture of powdered materials including powdered aluminum and an additive;

compressingly molding the mixture to produce an intermediate product having a shape substantially the same as a final shape of the rotary polygon mirror;

vacuum sintering the intermediate product to obtain a blank of the rotary polygon mirror; and cutting the blank to produce a reflecting surface of the rotary polygon mirror.

8. A method for manufacturing a rotary polygon mirror as claimed in claim 7, further comprising:

in said molding step, forming a through hole in the rotary polygon mirror for engaging the rotary member; and plastically working the inner circumferential surface of the through hole to size the through hole.

9. A method for manufacturing a rotary polygon mirror as claimed in claim 7, further comprising:

heat treating the blank to harden the blank.

* * * * *